United States Patent Office 3,847,941
Patented Nov. 12, 1974

3,847,941
5-HYDROXYTRYPTOPHAN ALPHA-KETO-
GLUTARATE AND ITS DERIVATIVES
Miguel Fernandez Brana and Christobal Martinez Roldan,
Madrid, Spain, assignors to Laboratorios Made, S.A.,
Madrid, Spain
No Drawing. Filed June 11, 1973, Ser. No. 368,829
Int. Cl. C07d 27/00, 27/56
U.S. Cl. 260—326.14                                    1 Claim

ABSTRACT OF THE DISCLOSURE

A compound of the formula

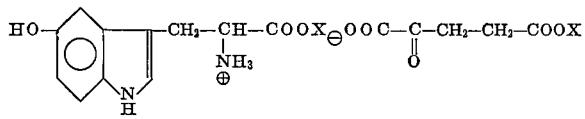

in which X is hydrogen, alkali or alkaline earth metal or basic organic radical, is prepared by reacting alpha-ketoglutaric acid with 5-hydroxytryptophan. The compound is useful for treating various nervous disorders.

---

The present invention relates to 5-hydroxytryptophan alpha-ketoglutarate and its derivatives.

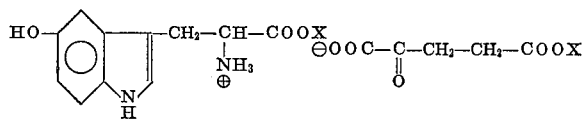

in which X is hydrogen, alkali or alkaline earth metals, or basic organic compounds.

The general method of synthesis of these compounds consists of dissolving equimolar amounts of alpha-ketoglutaric acid and 5-hydroxytryptophan together or separately and at temperatures never exceeding 40° C., in the smallest possible amount of a suitable solvent, preferably water. This solution can be neutralized with any type of basic compound, organic or inorganic, or used as it is. Any of the aforementioned solutions can be freeze-dried or the solid salts precipitated using an organic solvent soluble in water.

Example

Although the reaction has been achieved in various solvents, both organic and inorganic, a reaction effected in water will be described as an example because this solvent is preferred.

1.1011 g. (0.005 moles) of 5-hydroxytryptophan together with 0.7305 g. (0.005 moles) of alpha-ketoglutaric acid are dissolved in 40 ml. of distilled water at 30° C. To speed dissolving, the mixture is agitated vigorously using an electromagnetic agitator. The solution is filtered and the filtered liquid is freeze-dried at ambient temperature and at a pressure of $2 \times 10^{-2}$ mm. of Hg.

The salt, consisting of long yellowish-white needles, is obtained with practically quantitative yield. A sample dried in a vacuum over phosphoric anhydride at ambient temperature is analyzed.

Calculated for $C_{16}H_{18}N_2O_8$: Carbon, 52.45%; H, 4.91%; N, 7.67%. Found: C, 52.44%; H, 5.08%; N, 7.62%.

The product is a yellowish-white solid crystallized in the form of needles, which decomposes at 200–210° C., although it begins to become cloudy long before. It is soluble in water and alcohol, and is insoluble in ether and other nonpolar solvents. The alcohol solution left at ambient temperature for several days turns greenish-blue.

The product obtained by this method is new, and in the specific applications for which it is intended, it has the advantages of its great tolerance, powerful pharmacological activity and easy solubility in water.

The pharmacological properties of the new compound will be elucidated in the following.

When administered to test animals, 5-hydroxytryptophan (5 HTP) penetrates rapidly into the tissues and is converted into serotonin by means of the action of 5 HTP decarboxylase.

The general pharmacology of 5 HTP has been broadly studied by D. F. Bogdanski, H. Weissbach and S. Undenfriend. (J. Pharmac. exp. Ther. 122, 182, 1958).

These authors studied several doses of 5 HTP and their effects on the behavior and spontaneous activity, autonomous effects on the cardiovascular system, secretory, gastrointestinal and respiratory effects and determined the haematic and tissular levels of the 5 HTP and of the serotonin produced. They also studied some interesting pharmacological interactions.

It is deduced from the principal conclusions of this study that the 5 HTP is capable of penetrating the haematoencephalic barrier so that it can be converted into serotonin on the level of the central nervous system, and that it has the advantage over amine of maintaining relatively high levels of serotonin for long periods of time.

(a) Study on blood pressure

Beagles anesthetized with pentobarbital at a dose of 30 mg./kg. are used. The carotid is clysterised by connecting it to a Standard blood pressure transducer. The femoral vein is also clysterised so that it can serve as a passage for administration of the products being tested.

The response of the animal to standard doses of adrenaline, acetylcholine and noradrenaline is determined firstly. L - 5 - hydroxytryptophan alpha - ketoglutarate is then injected, at several dosage levels and, finally, the standard doses of adrenaline, acetylcholine and noradrenaline are checked again.

It is verified that with doses of up to 10 mg./kg. of L-5-hydroxytryptophan alpha-ketoglutarate there is no alteration of the standard responses already indicated and that at the same dosage level the L-5-hydroxytryptophan alpha-ketoglutarate does not provoke, by itself, any response in intravenous injection.

(b) Local tolerance

Material and methods.—Hand-stripped guinea pigs are used and they are intradermally injected on the back with a dose of 0.3 ml. of dissolved product from an ampoule containing buffered solvent. The same product dissolved in distilled water is used for comparison, i.e. the content of each vial was taken to the foreseen volume by using distilled water instead of buffered solvent. The irritation intensity is established in accordance with the Ludeuna and Hoppe scale. The irritation zone is exposed with intravenous injection, in the vein of the penis, of 1 ml. of 1% trian blue solution.

Results.—The zones injected with product dissolved in phosphates buffer did not show signs of irritation and only in some cases was there a very slight irritation (0 to 2 of the Luduena and Hoppe scale).

The product dissolved in distilled water showed zones of moderate and marked irritation (6 and 8 of the Luduena and Hoppe scale).

Summary.—By correcting the acidity of the product with an appropriate solvent it is not expected that reactions of local irritation will arise in parenteral administration. (Composition of the buffered solvent:

$NaH_2PO_4 \cdot H_2O$—36.83 mg., $Na_2HPO_4$—56.82 mg., distilled water, sufficient quantity for 3 c.c.)

(c) Effect of L-5-HTP and of L-5-hydroxytryptophan α-ketoglutarate on the concentration of serotonin in rats' brains Method used.—The method of P.A. Shore and J. S. Olin (J. Pharmacol. Exptl. Ther 122, 295 (1958) modified by L. Valzelli, has been used for the extraction of the serotonin from the brain tissue. The rat is sacrificed by decapitation and the whole brain is extracted, removing the olfactory bulbs and the cerebellum therefrom. The tissue is homogenized with 3 ml. of HCl (0.01 N), and the homogenized product is washed with another 3 ml. of HCl which are added to the previous ones. 4.5 g. of NaCl and 15 ml. of n-butanol are added to the whole. It is vigorously shaken for 20 minutes in a shaker and is subsequently centrifuged at 4–5,000 r.p.m. for 5 minutes. 10 ml. of butanol are taken from the centrifuged product, adding thereto 4 ml. of HCl (0.01 N) and 17 ml. of n-heptane. There is further mechanical shaking for 15 minutes and further centrifugation for 5 minutes. 1.5 ml. are taken from the acid phase, completing them with a further 3 ml. of HCl (0.01 N) and then taking the reading on the spectrophotofluorimeter: $\lambda=310$ m$\mu$, $\lambda=345$ m$\mu$. The concentration of serotonin is calculated on a calibration line calculated on the basis of known concentrations of serotonin. The value of serotonin found is subsequently corrected according to the recovery obtained, for which purpose another homogenized brain sample, to which a known quantity (1 $\mu$g.) of serotonin (internal Standard) has been added, is processed at the same time.

5 HTP and 5-hydroxytryptophan α-ketoglutarate were administered by i.p. route one hour before decapitation of the animals. A single dose of 50 mg./kg. of 5-HTP was used, at which, according to H. Green and J. L. Sawyer (in Progress in Brain Research, Elsevier, 1964), the brain concentration of serotonin increases a little more than 100% after approximately one hour, decreasing later. The dose of 5-hydroxytryptophan α-ketoglutarate used was calculated in such a way that it was equivalent to 50 mg./kg. of 5-HTP.

Results

1. Concentration of serotonin in brains of untreated animals.—The following values were obtained. The concentrations are expressed in ng. of serotonin per g. of brain: 581.7; 362.0; 875.0; 430.0; 887.0; 344.0; 988.0; 350.0; 662.0; 308.0; 950.0 321.8; 522.0; 559.0; 632.0; 366.8; 513.0; 307.0 (18 experiments).

Average ± e.e.=553.26±55.1 ng./g.

2. Concentration of serotonin in animals treated with 50 mg./kg. of L-5-HTP.—The following individual values were obtained: 982.0; 932.1; 1155.4; 886.0; 1691.4; 1003.0; 1620.0 (7 experiments). Average ± e.e.=1181.41±126.9 ng./g.

3. Concentration of serotonin in animals treated with L-5-HTP α-ketoglutarate (quantity equivalent to 50 mg./kg. of 5-HTP).—The following individual values were obtained: 1495.8; 1567.6; 1331.1 (3 experiment). Average ± e.e.=1464.83±70.00 ng./g.

Using the Student $t$ (monodirectional test) this average value is significantly superior ($p<0.05$) to the one obtained in section 2.

Acute toxicity

Product tested.—Freeze-dried L-5-hydroxytryptophan alpha-ketoglutarate, in vials containing the equivalent of 25 mg. of L-5-hydroxytryptophan. The content of the vials is dissolved in the phosphate buffer.

Test animal.—I.C.R. Swiss white mouse weighing 30±2 g.

Experimental conditions.—Temperature 22±2° C. Relative humidity 40 to 50%.

Nutrition.—The animals fasted for 24 hours prior to the experiment.

Intravenous route

Doses of 8.3 mg., 12.5 mg. and 25 mg. are administered into the caudal vein of mice, without deaths occurring.

Intraperitoneal route

The doses administered are 8.3 mg., 12.5 mg., 25 mg. and 35 mg., without any animal dying. Diarrhea occurs one hour after administration of the product.

Oral route

A gastric probe is used. Doses of 8.3 mg., 12.5 mg., 25 mg. and 35 mg., were administered without causing test animal death or any alteration other than the appearance of diarrhea.

Higher doses have not been tested because they are not permitted by the solubility of the product, as it would be necessary to administer volumes which could conceal the toxicity of the drug.

The compound can be used for treating various nervous disorders, including

1. Endogenous depression
2. Involutive depression
3. Depressive symptoms in schizophrenia
4. Circular psychosis
5. L-Dopa psychosis
6. Presenile insanity
7. Oligophrenias
8. Anguish neurosis
9. Phobic neurosis
10. Obsessive neurosis
11. Epileptic psychosis
12. Post-traumatic psychosis
13. Huntington's chorea.

The compound can be administered to patients in a variety of dosage form, including the following.

(a) Available forms (1) Vials.—Each vial contains 41.6 mg. of L-5-hydroxytryptophan alpha-ketoglutarate, equivalent to 25 mg. of L-5-hydroxytryptophan.

(2) Capsules.—Each capsule contains 41.6 mg. of L-5-hydroxytryptophan alpha-ketoglutarate, equivalent to 25 mg. of L-5-hydroxytryptophan (in the form of slow yielding microgranules).

(b) Dosage and routes (1) Vials.—1–2 vials in 24 h. (up to 4 vials per day), by intravenous or intramuscular route.

(2) Capsules.—2–3 capsules every 24 hours.

The embodiments of the invention in which an exclusive property or privilege is claimed are defined as follows:

1. A compound of the formula:

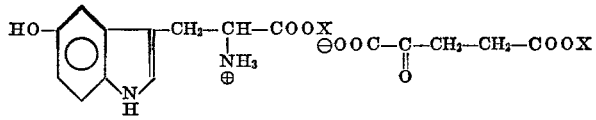

in which X is hydrogen, alkali or alkaline earth metals, or basic organic radical compounds.

References Cited

Chemical Abstracts, Vol. 75, 1971, p. 313, Par. 151.677a.

ELBERT L. ROBERTS, Primary Examiner

U.S. Cl. X.R.

424—274